(12) United States Patent
Ebina

(10) Patent No.: US 7,074,031 B2
(45) Date of Patent: Jul. 11, 2006

(54) DIE FOR MOLDING DISC SUBSTRATES

(75) Inventor: Toshiyuki Ebina, Ohbu (JP)

(73) Assignee: Kabushiki Kaisha Meiki Seisakusho, Aichi-ken (JP)

( * ) Notice: Subject to any disclaimer, the term of this patent is extended or adjusted under 35 U.S.C. 154(b) by 0 days.

(21) Appl. No.: 11/023,345

(22) Filed: Dec. 29, 2004

(65) Prior Publication Data

US 2005/0170034 A1 Aug. 4, 2005

(30) Foreign Application Priority Data

Feb. 4, 2004 (JP) .............................. 2004-027466

(51) Int. Cl.
*B29D 11/00* (2006.01)
(52) U.S. Cl. ...................................... 425/542; 425/810
(58) Field of Classification Search ............ 425/192 R, 425/542, 810; 264/1.33, 106
See application file for complete search history.

(56) References Cited

U.S. PATENT DOCUMENTS 6,238,197 B1 * 5/2001 Van Hout et al. ........... 425/168
6,322,350 B1 * 11/2001 Voets et al. .................. 425/548
6,514,437 B1 * 2/2003 Higashida et al. ......... 264/1.33

FOREIGN PATENT DOCUMENTS

| JP | 63-182117 | * | 7/1988 |
| JP | 10-302328 | | 11/1998 |

OTHER PUBLICATIONS

English abstract for JP 63-182117.*

* cited by examiner

*Primary Examiner*—Donald Heckenberg
(74) *Attorney, Agent, or Firm*—Browdy and Neimark, PLLC

(57) ABSTRACT

The present invention aims at increasing service life of an inner circumferential stamper holder in a die for molding disc substrates that is used when the disc substrates are injection molded. To that end, in the die for molding the disc substrates in which a stamper 3 is supported by at least one of a stationary die 6 and a movable die 1, an abrasion resistant treatment is applied to at least a portion, which abuts against a side surface 3a of a center opening of the stamper 3, of an outer circumferential surface 4a of the inner circumferential stamper holder 4 supporting the stamper 3.

3 Claims, 3 Drawing Sheets

DIE FOR MOLDING DISC SUBSTRATES

BACKGROUND OF THE INVENTION

1. Field of the Invention

The present invention relates to a die for molding disc substrates that is used when disc substrates, for recording information are molded.

2. Description of the Related Art

A die for molding disc substrates is comprised of a stationary die and a movable die, between which a cavity is formed when both are aligned with each other. Then, as shown in FIG. 3, a stamper 3 for transferring information to molded disc substrates is attached to a surface 2a of a specular plate 2 in at least one of the dies by an inner circumferential stamper holder 4 and an outer circumferential stamper holder 5, which support an inner circumference and an outer circumference of the stamper 3, respectively. The inner circumferential stamper holder 4 has a cylindrical shape and it is provided with an outer circumferential surface 4a that is formed around its outer circumference, and a claw member 4b that is formed around the outer circumferential portion of a cavity forming surface or one end face of the inner circumferential stamper holder 4 to support the stamper. Then, in the inner circumferential stamper holder 4, said outer circumferential surface 4a abuts against a side surface 3a of a center opening of the stamper 3 and said claw member 4b supports an inner circumferential portion 3b. However, because the stamper abutting surface 4c of the outer circumferential surface 4a of the inner circumferential stamper holder 4 abuts against the side surface 3a of the center opening of the stamper 3 as described above, the outer circumferential surface 4a is gradually worn away due to reasons such as friction with the side surface 3a of the center opening of the stamper 3 as the molding operation is performed repeatedly. Then, as the abrasion of the outer circumferential surface 4a of the inner circumferential stamper holder 4 progresses, the stamper 3 deviates from the center of the inner circumferential stamper holder 4, which may result in defects in the molded disc substrates. Therefore the conventional inner circumferential stamper holder 4 must be replaced about every month due to the abrasion of the stamper abutting surface 4c of the outer circumferential surface 4a and, as a result, costs are increased.

On the other hand, a technique for preventing the abrasion of the inner circumferential stamper holder 4 as set forth in Japanese Unexamined Patent Publication No. H10-302328 is well-known. FIG. 8 of Japanese Unexamined Patent Publication No. H10-302328 mentioned above shows that a back of a fastening claw member 127 of a stamper fastening member 126, which corresponds to the inner circumferential stamper holder 4 in this specification, is coated with a metallic compound to prevent the abrasion of said fastening claw member 127. However, the coating over the back of the fastening claw member 127 is not effective for preventing the deviation of the stamper 3 from the center of the stamper fastening member 126 and it does not result in increased service life of the stamper fastening member 126. Rather, there is a problem in that the coating over the backside of the fastening claw member 127 makes it difficult to finish the back of the fastening claw member 127 after the coating is applied. Further, FIG. 9 of Japanese Unexamined Patent Publication No. H10-302328 mentioned above shows that a second protective layer such as lubricating oil is formed on a contact portion where a stamper 111 makes contact with a stamper fastening member 125 in the thickness direction of an optical disc. However, as a matter of fact, the second protective layer shown in FIG. 9 of Japanese Unexamined Patent Publication No. H10-302328 is not significantly effective for preventing the abrasion of the stamper fastening member 125 from progressing. Moreover, it is difficult to apply the lubrication oil to an outer circumference of said stamper fastening member 125 uniformly and maintain the uniformly applied layer for a long time and, further, there are problems in that a fixing position of the stamper is likely to deviate from the center and the lubrication oil may leak out to the surface of the stamper if too much lubrication oil is applied.

BRIEF SUMMARY OF THE INVENTION

In view of the above problems, according to the present invention, there is provided a die for molding disc substrates in which a stamper is supported by at least one of a stationary die and a movable die, wherein an abrasion resistant treatment is applied to at least a portion, which abuts against a side surface of a center opening of the stamper, of an outer circumferential surface of an inner circumferential stamper holder supporting the stamper so as to increase service life of the inner circumferential stamper holder. Then, as a result of the increase of the service life of the inner circumferential stamper holder, manufacturing costs of the disc substrates can be reduced.

DETAILED DESCRIPTION OF THE INVENTION

Figure 1:
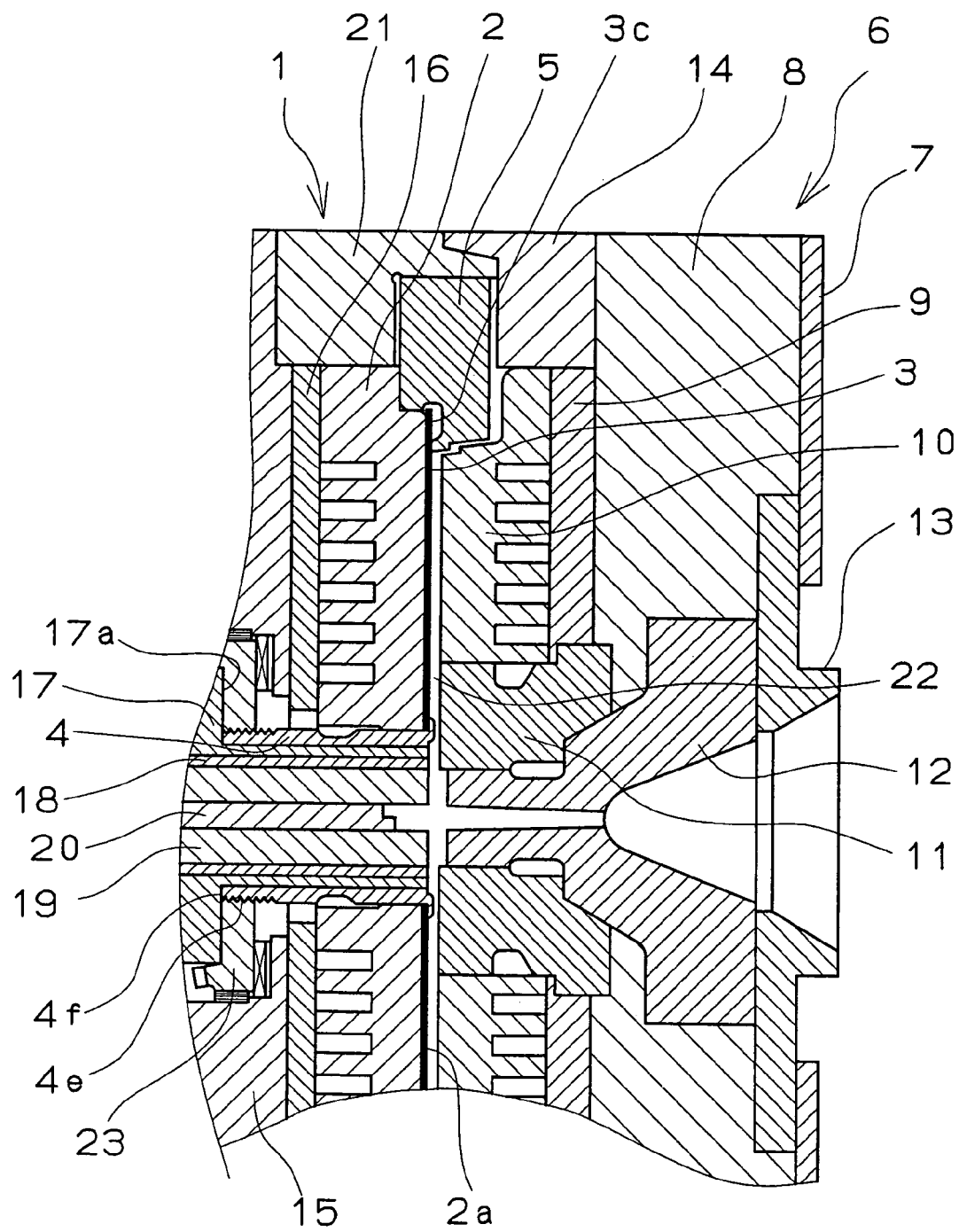
FIG. 1 is a cross-sectional view showing an important part of a die for molding disc substrates according to an embodiment.

As shown in FIG. 1, a stationary die 6 is comprised of: a stationary die plate 8 that is attached to a stationary platen (not shown) of an injection molding machine via a thermal insulation plate 7; a stationary specular plate 10 that is fastened to a surface of the stationary die plate 8, which is opposite to that faced by the thermal insulation plate 7, via a stationary back plate 9; a gate insert 11 that is inserted through center openings of the stationary die plate 8, the stationary back plate 9 and the stationary specular plate 10; a sprue bush 12 and a positioning plate 13; a stationary outer circumferential ring 14 that is inserted around outer circumferential end faces of the stationary back plate 9 and the stationary specular plate 10 and fastened to the stationary die plate 8; and other elements.

Figure 2:
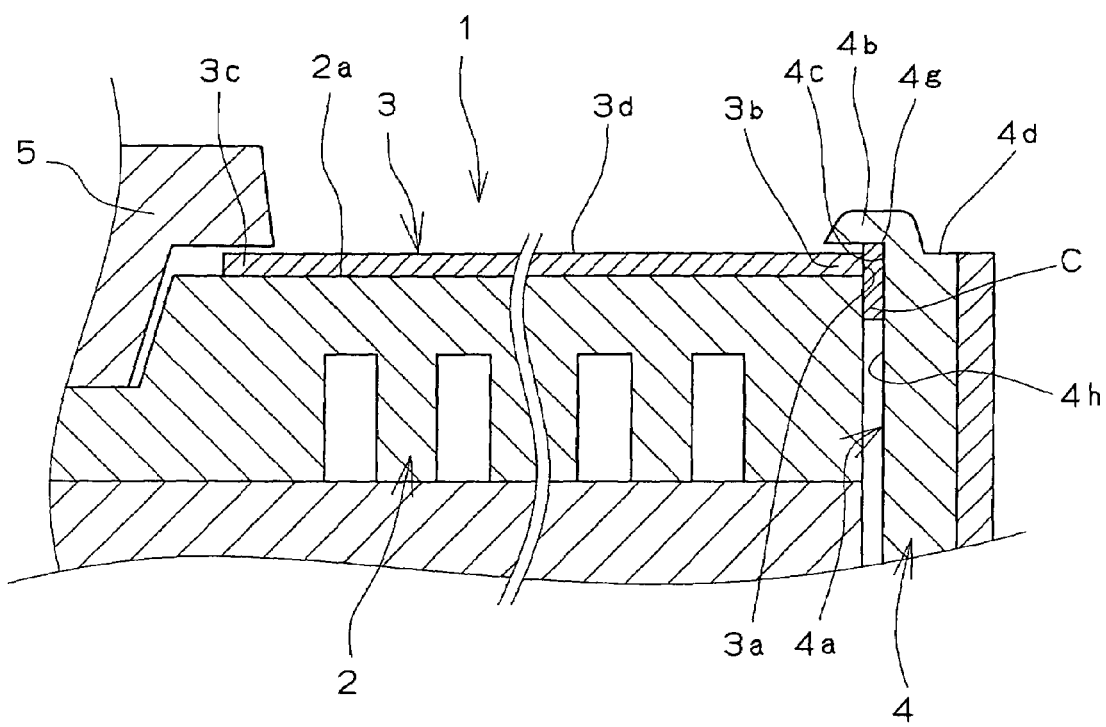
FIG. 2 is an enlarged cross-sectional view showing an important part of a movable die according to an embodiment.
Figure 3:
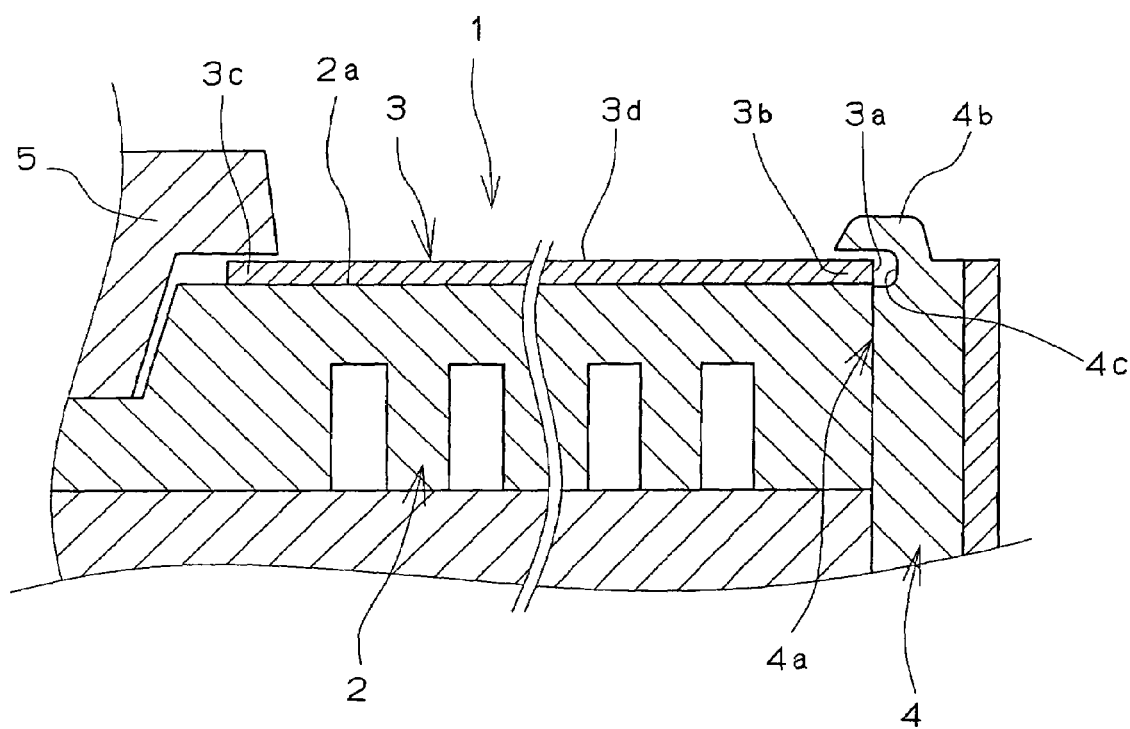
FIG. 3 is an enlarged cross-sectional view showing an important part of a conventional movable die.

As shown in FIGS. 1 and 2, a movable die 1 that is attached to a movable platen of the injection molding machine is comprised of: a movable die plate (not shown); an intermediate plate 15 that is fastened to a surface of the movable die plate toward the stationary die 6; a movable specular plate 2 that is fastened to a surface of the intermediate plate 15 toward the stationary die 6 via a movable back plate 16; a stamper 3 that is disposed on a surface 2a of the movable specular plate 2 faced by the stationary specular plate 10; an outer circumferential stamper holder 5 that supports an outer circumferential portion 3c of the stamper 3 to allow the movable specular plate 2 to support the stamper 3; an inner circumferential stamper holder 4, that acts as a supporting member that is movably inserted through center openings of the intermediate plate 15, the movable back plate 16 and the movable specular plate 2 and abuts against a side surface 3a of a center opening of the stamper 3 to allow the movable specular plate 2 to support said stamper 3; a stationary sleeve 17 that guides an internal hole of the inner circumferential stamper holder 4 and that is fastened to the movable die plate; an ejector 18 that is inserted through an internal hole of the stationary sleeve 17 slidably in the axial direction; a male cutter 19 that is inserted through, an internal hole of the ejector 18 slidably in the axial direction; an ejector pin 20 that is inserted through an internal hole of the male cutter 19 slidably in the axial direction; a movable outer circumferential ring 21 that is inserted around outer circumferential end faces of the movable back plate 16 and the movable specular plate 2 and fastened to the intermediate plate 15; a rotation means (not shown) that drives the inner circumferential stamper holder 4 to advance or retreat in the axial direction; and other elements. The movable die 1 is aligned with the stationary die 6 described above to constitute a die for molding disc substrates and form a cavity 22 therebetween.

The stamper 3 is made of nickel or nickel alloy having a Vickers hardness of Hv 300–400. The stamper 3 is a doughnut-shaped plate-like member having a thickness of about 0.2–0.3 mm and it has a transfer surface 3d formed thereon for transferring information to a molded disc substrate. A nearly perfect circular center opening is formed at the center position of the stamper 3 and the side surface 3a is formed on the inner circumferential wall of the center opening. Then, the stamper 3 is supported by the inner circumferential stamper holder 4, the outer circumferential stamper holder 5 and a suction means (not shown) so that the stamper 3 is not separated from the surface 2a of the movable specular plate 2. The stamper 3 is a consumable part to be replaced every time a predetermined number of molding processes are performed and, when the stamper 3 is replaced, the inner circumferential stamper holder 4 and the outer circumferential stamper holder 5 are removed to replace the stamper 3. In this connection, though the stamper 3 is attached to the movable die 1 only in this embodiment, it may be disposed on at least one of the movable die 1 and the stationary die 6.

The inner circumferential stamper holder 4 is a cylindrical member that is inserted through the center opening of the stamper 3 to support the stamper 3 and it is made of 13 Cr stainless steel containing chromium or more specifically, SUS420J2 (a Vickers hardness of Hv 550–580) similarly to other die members such as the movable specular plate 2. An end face 4d of the inner circumferential stamper holder 4 is provided with a claw member 4b that is engaged with an inner circumferential portion 3b of the stamper 3 to support the stamper 3. The claw member 4b is formed so that it is projected from the end face 4d of the inner circumferential stamper holder 4, which acts as a cavity forming surface, toward the stationary die 6 and it diverges outward and the back of the claw member 4b is opposed to the surface of the inner circumferential portion 3b of the stamper 3 to support the stamper 3. Further, a male thread 4e is provided on an outer circumferential surface 4a at the other end of the inner circumferential stamper holder 4 and the male thread 4e is screwed with a female thread provided on an inner circumference of a gear 23. Then, the other end face 4f at the other end of the inner circumferential stamper holder 4 abuts against an abutting surface 17a of the stationary sleeve 17 to position the inner circumferential stamper holder 4. Then, the inner circumferential stamper holder 4 is disposed so that its outer circumferential surface 4a is slidably inserted through the center openings of the movable specular plate 2 and other elements and a stamper abutting surface 4c on the outer circumferential surface 4a abuts against the side surface 3a of the center opening of said stamper 3 at least under thermal expansion at the time of molding. Therefore, the inner circumferential stamper holder 4 can be attached so that its outer circumferential surface 4a can position the stamper 3 so as not to deviate from the center with respect to the direction along the surface 2a of the movable specular plate 2 and so that its claw member 4b can prevent the stamper 3 from being separated from the surface 2a of the movable specular plate 2.

Then, in the inner circumferential stamper holder 4 in this embodiment, an abrasion resistant treatment is applied to the stamper abutting surface 4c on the outer circumferential surface 4a abutting against the side surface 3a of the center opening of the stamper 3 to prevent abrasion of the inner circumferential stamper holder 4. In this embodiment, on the outer circumferential surface 4a of the inner circumferential stamper holder 4 except the back of the claw member 4b, a strip-like abrasion resistant layer C is formed in the range of 2 mm from a boundary line 4g between the back of the claw member 4b and the outer circumferential surface 4a. It may suffice that the abrasion resistant treatment is applied to at least a portion, for example, a strip-like portion having a width of 0.2–0.4 mm that is the stamper abutting surface 4c abutting against the side surface 3a of the center opening of the stamper 3 but, in consideration of ease of treatment and the possibility that abrasion resistant material is peeled from the outer circumferential surface 4a, it is desirable that the abrasion resistant treatment is applied to a somewhat larger area extending up to a portion of a surface 4h opposed to the movable specular plate 2. Further, it is not necessary to apply the abrasion resistant treatment to the back of the claw member 4b particularly. The abrasion resistant treatment is applied only to the outer circumferential surface 4a of the inner circumferential stamper holder 4.

In this embodiment, the abrasion resistant treatment applied to the inner circumferential stamper holder 4 is done using DLC (diamond-like carbon) having a Vickers hardness of Hv 3000–5000 and a static friction coefficient of 0.10 when it is not used and before attachment. The abrasion resistant layer C using the DLC is first coated to a thickness of 1–5 lm and, then, finished by polishing using a diamond paste and the like to be dimensioned so that the outside diameter of the outer circumferential surface 4a of the inner circumferential stamper holder 4 is a predetermined value. The abrasion resistant layer C may be dimensioned through physical surface treatment by methods other than that using the diamond paste. In this connection, though the thickness of the abrasion resistant layer C is shown in an exaggerated manner in FIG. 2, the abrasion resistant layer C is coated to the thickness mentioned above and, moreover, finished by polishing in effect and, therefore, it is too thin to affect the insertion of the inner circumferential stamper holder 4 through the center opening of the movable specular plate 2. Further, a step portion of a slightly smaller diameter may be formed on the outer circumferential surface 4a of the inner circumferential stamper holder 4 and the abrasion resistant layer C such as the DLC may be applied to the step portion and, moreover, if the inner circumferential stamper holder 4 is worn away, the abrasion resistant treatment may be applied again.

Further, in place of said DLC, the inner circumferential stamper holder 4 may be coated with various nitrides including: titanium nitrides such as, among others, TiN (having a Vickers hardness of Hv 1000–1400 and a static friction coefficient of 0.45 when it is not used), TiCN, TiCrN and TiALN; silicon nitrides such as SiN and Si3N4; and other nitrides such as AlN, TaN and ZrN. Still further it may be coated with carbides such as SiC and TiC. Moreover, it may be plated with metal materials such as, among others, hard chromium plating (having a Vickers hardness of Hv 1000–1200 and a static friction coefficient of 0.16 before attachment), and WCC (tungsten carbide coating). Further, a plurality of abrasion resistant layers C may be formed in a multi-layer manner by combining the materials mentioned above. In this case, it is desired that, a coating material having a thermal expansion coefficient relatively close to that of stainless steel, such as TiN, is applied as a lower layer and, then, another coating material having a lower thermal expansion coefficient, such as DLC, is applied as a surface layer. These coatings are applied by deposition methods such as PVD, CVD and plasma CVD, cathode sputtering, metal spraying, electroplating and the like and the thickness of the abrasion resistant layer C is in the range of 1–10 lm (the thickness is in the range of 100–300 lm in the case of hard chromium plating).

In this connection, in the abrasion resistant treatment of the inner circumferential stamper holder 4, it goes without saying that a higher hardness of the coating material is advantageous for increasing service life of the inner circumferential stamper holder 4 but, on the other hand, a low static friction coefficient is also important to prevent the abrasion of the side surface 3a of the center opening of the stamper 3 and, thus, the deviation of the stamper 3 from the center of the inner circumferential stamper holder 4. Therefore in this embodiment, it is more desirable that the inner circumferential stamper holder 4 is coated with a coating material having a static friction coefficient not more than 0.20 when it is unused. From the viewpoint described above, the DLC has a high hardness and a low friction coefficient and, therefore, it is preferable for abrasion resistant treatment of the inner circumferential stamper holder 4. While a technique for coating the surface 2a of the movable specular plate 2 with the DLC and the like is well-known, a remarkable effect to prevent the stamper 3 from deviating from the axis of the inner circumferential stamper holder 4 and to increase the service life of the inner circumferential stamper holder 4 can be further achieved by coating the outer circumferential surface 4a of the inner circumferential stamper holder 4 with the DLC.

Thus, in this embodiment, disc substrates can be molded by using the inner circumferential stamper holder 4 coated with said DLC while nothing is applied to the outer circumferential surface 4a. However, when other coating material having a relatively high static friction coefficient is used in this embodiment, a small amount of lubricant such as mineral oil may be applied to the outer circumferential surface 4a of the inner circumferential stamper holder 4 to reduce the static friction coefficient further. Here, in contrast to the conventional case in which the inner circumferential stamper holder 4 must be replaced about every month due to the abrasion of the outer circumferential surface 4a thereof, it becomes possible to use the inner circumferential stamper holder 4 for two months or more because the inner circumferential stamper holder 4 is coated with the DLC. Therefore, as a result of the increase of the service life of the inner circumferential stamper holder, manufacturing costs of the disc substrates can be reduced.

Further, though not shown specifically, it goes without saying that the present invention is not limited to the embodiment described above and alterations may also be made by those skilled in the art based on the spirit of the present invention. By way of example, the inner circumferential stamper holder 4 is not limited to that in which the claw member 4b is formed to project from the surface of the inner circumferential portion 3b of the stamper 3 and the surface of the inner circumferential portion 3b of the stamper 3 and the surface of the claw member 4b may be substantially at the same height when the stamper 3 is attached. Then, when the claw member 4b of the inner circumferential stamper holder 4 diverges in a tapered fashion, said coating is applied to the back of the claw member, which also acts as the stamper abutting surface. Further, though the center opening of the stamper 3 used in this embodiment is formed by punching, the abrasion resistant treatment and the treatment for reducing the static friction coefficient may be applied also to the side surface 3a of the center opening of the stamper 3 to further prevent the stamper 3 from deviating from the axis of the inner circumferential stamper holder 4.

What is claimed is:

1. A die for molding disc substrates in which a stamper is supported by at least one of a stationary die and a movable die,
    wherein an abrasion resistant treatment is applied to at least a portion, which abuts against a side surface of a center opening of the stamper, of an outer circumferential surface of an inner circumferential stamper holder supporting the stamper;
    wherein said inner circumferential stamper holder is made of stainless steel, and
    said abrasion resistant treatment is a coating of any of DLC, a nitride, a carbide, hard chromium and tungsten carbide applied to said stainless steel.

2. A die for molding disc substrates according to claim 1, wherein the abrasion resistant treatment is applied only to the outer circumferential surface of said inner circumferential stamper holder.

3. A die for molding disc substrates according to claim 1, wherein said abrasion resistant treatment is applied to said inner circumferential stamper holder and, then, the abrasion resistant surface is finished physically so that an outside diameter of the outer circumferential surface abutting against the side surface of the center opening of said stamper is a predetermined value.

* * * * *